UNITED STATES PATENT OFFICE.

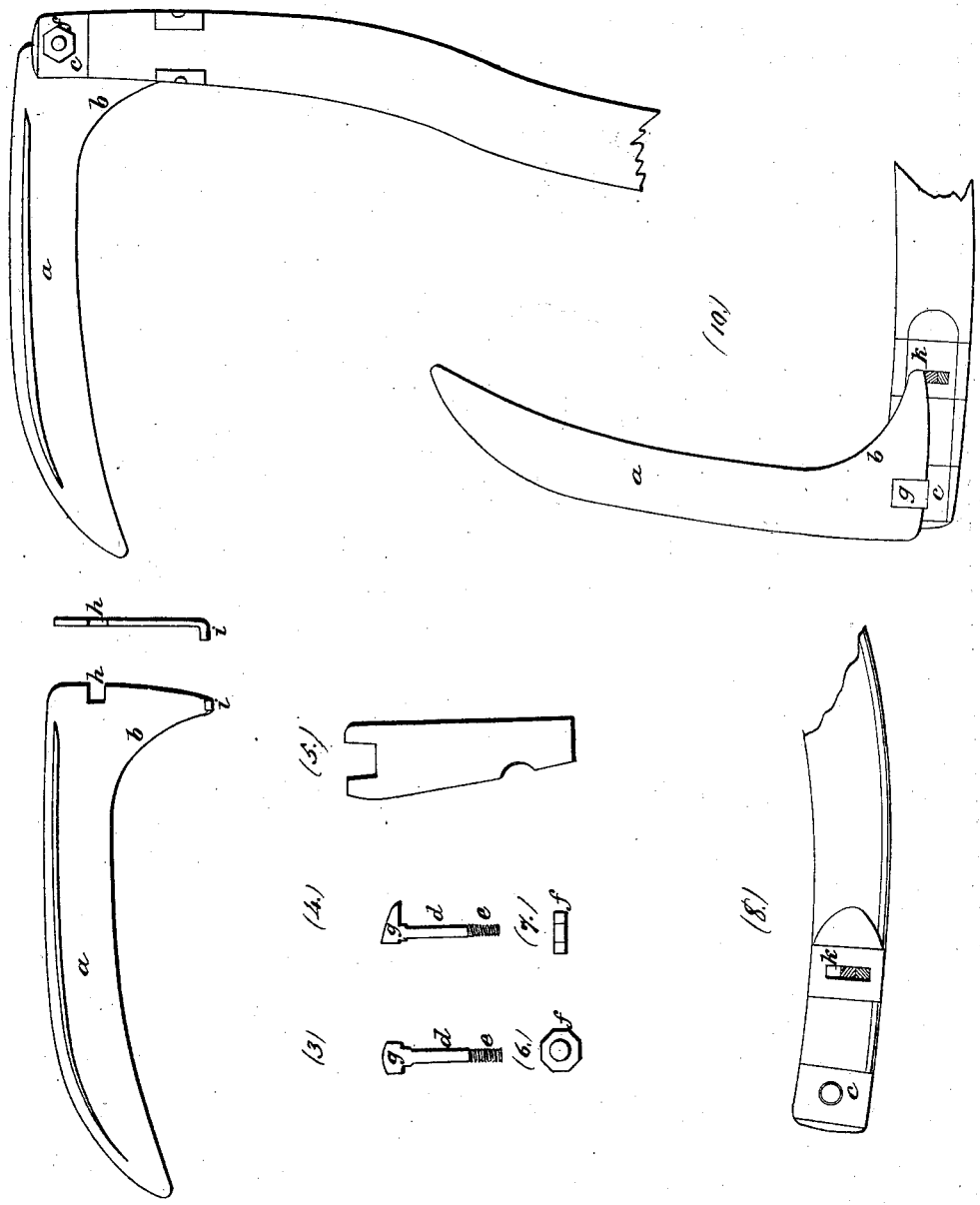

WM. P. GREENLEAF, OF WASHINGTON, NEW HAMPSHIRE.

IMPROVEMENT IN THE SHAPE OF SCYTHES.

Specification forming part of Letters Patent No. 10,011, dated September 13, 1853.

*To all whom it may concern:*

Be it known that I, WM. P. GREENLEAF, of Washington, in the county of Sullivan and State of New Hampshire, have made a new and useful Improvement in Scythe-Blades; and I hereby declare the following to be a full, clear, and exact description of the same, reference being had to the annexed drawings, making a part of this specification, in which—

Figure 1 is a view of the scythe-blade; Fig. 2, an edge view of the same; Figs. 3 and 4 the bolt, and Figs. 6 and 7 the nut for securing the blade to the snath; Fig. 5, the wrench used for tightening and loosening the nut; Fig. 8, a view of the snath without the blade; Fig. 9, the scythe hung in its snath; Fig. 10, a view of the same from the other side.

$a$ is the scythe-blade, the cutting-edge of which is curved and extended, as seen at $b$, for the purpose of enabling it to cut bushes or other growth which may occur in the mowing land. This curved extension of the blade reaches to near the end of the shank, and it will be perceived that in addition to the facility which it affords of cutting bushes, &c., the blade of the scythe is materially strengthened thereby.

Where scythes of the ordinary construction are used the occurrence of bushes and sprouts from the roots of trees present a serious impediment to the operation of mowing, for either the bushes slide up the blade until they reach the snath, which bends them down, and they escape uncut; or where they are large and unyielding the scythe may be stopped or broken, and the bush requires to be removed by hand.

With my scythe the mower gives a smart jerk toward himself at the instant that the bush is opposite the curved portions of the blade, which thus gives a draw cut, and severs the bush near the surface of the ground with but little expenditure of force and without danger of breaking the scythe. The scythe-fastening now most commonly in use is evidently not adapted to blades of this construction, as it is essential to their successful operation that the shank be left entirely free along its inner edge. I have therefore contrived a fastening to be used with my scythe, which may be described as follows: $c$ is a metallic ring, fitted to the extremity of the snath. $d$ is a bolt passing through the snath and ring, and having a screw, $e$, and nut $f$ at one end and a flat head, $g$, at the other. A square notch, $h$, is cast in the scythe-blade sufficiently large to receive the square shank of the bolt $d$. When the scythe is to be hung the claw $i$ is placed in the hole $k$, as usual, and the heel of the scythe is slipped beneath the head of the bolt, when a single turn of the nut makes all secure, the strain in mowing always tending to press the blade firmer into its place, and not to tear it out.

What I claim as my invention, and desire to secure by Letters Patent, is—

Widening and curving the blade of the scythe at the shank, in the manner described, for the purpose of strengthening the same and adapting it to cutting bushes as well as grass.

WM. P. GREENLEAF.

Witnesses:
CHAS. BROWER,
SAM. COOPER.